United States Patent
Kim (10) Patent No.: US 7,286,171 B2
(45) Date of Patent: Oct. 23, 2007

(54) APPARATUS AND METHOD FOR CONCEALING DEFECTIVE PIXELS IN IMAGE SENSORS HAVING TEST MODE

(75) Inventor: Hyun-Eun Kim, Anyang-si (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 554 days.

(21) Appl. No.: 09/983,654

(22) Filed: Oct. 25, 2001

(65) Prior Publication Data
US 2002/0080253 A1    Jun. 27, 2002

(30) Foreign Application Priority Data
Oct. 25, 2000    (KR) ............... 2000-63040

(51) Int. Cl.
H04N 9/64     (2006.01)
H04N 5/225    (2006.01)

(52) U.S. Cl. ............. 348/246; 348/187; 348/374
(58) Field of Classification Search ............... 348/241, 348/243, 246, 247, 250
See application file for complete search history.

(56) References Cited

U.S. PATENT DOCUMENTS

| | | | | |
|---|---|---|---|---|
| 5,047,861 A | * | 9/1991 | Houchin et al. ............ 348/247 |
| 5,754,710 A | * | 5/1998 | Sekine et al. ............... 382/300 |
| 5,808,681 A | * | 9/1998 | Kitajima ..................... 348/371 |
| 6,002,433 A | * | 12/1999 | Watanabe et al. ........... 348/246 |
| 6,340,989 B1 | * | 1/2002 | Oda ........................... 348/246 |
| 6,665,009 B1 | * | 12/2003 | Dong ......................... 348/246 |
| 6,724,945 B1 | * | 4/2004 | Yen et al. ................... 382/274 |

FOREIGN PATENT DOCUMENTS

| | | |
|---|---|---|
| JP | 07-143408 | 6/1995 |
| JP | 2000-217039 | 8/2000 |
| JP | 2001-128068 | 5/2001 |

* cited by examiner

Primary Examiner—Ngoc-Yen Vu
Assistant Examiner—Carramah J Quiett
(74) Attorney, Agent, or Firm—Lowe Hauptman Ham & Berner LLP (57) ABSTRACT

An apparatus and method for concealing defective pixels in image sensors having a test mode. The image sensing apparatus includes a sensing module for capturing an image from an object, wherein the sensing module includes a plurality of pixels and a light source for detecting a defect of the pixel and wherein the light source is turned on or off for a test mode; a controller for determining whether there are any detective pixels in an image frame received from the sensing module using the light source and for storing a position about defective pixels; and an image concealment unit for comparing a position of the detected defective pixels with a position of the image frame of the object and for concealing the detected defective pixels.

23 Claims, 10 Drawing Sheets

APPARATUS AND METHOD FOR CONCEALING DEFECTIVE PIXELS IN IMAGE SENSORS HAVING TEST MODE

FIELD OF THE INVENTION

The present invention relates to an apparatus and method for concealing defective pixels in image sensors having a test mode.

DESCRIPTION OF THE RELATED ART

Generally, an image sensor is a semiconductor device that comprises CCD or CMOS and is the most important device for inputting visual information. This image sensor can be used in camcorders, digital cameras, scanners and other image reproduction systems.

The image information can be described as light information and it can be distinguished by its luminosity and color. An image sensor is the device that converts information to electrical signals, more particularly, it converts analog electrical signals to digital signals to complete digitized image processes.

An image sensor may be said to have a plurality of pixels in a two-dimensional structure and each pixel converts its light into an electrical signal depending on its brightness. By measuring its electrical signal, the amount of light which comes into each pixel can be defined and an image of pixel units can be formed by the defined values.

On this occasion, the operation of each pixel is similar to that of a solar cell. That is, the brighter the light, the greater the electric charge accumulated, and the intensity of the light is defined by measuring accumulated charges within the fixed time.

Figure 1:
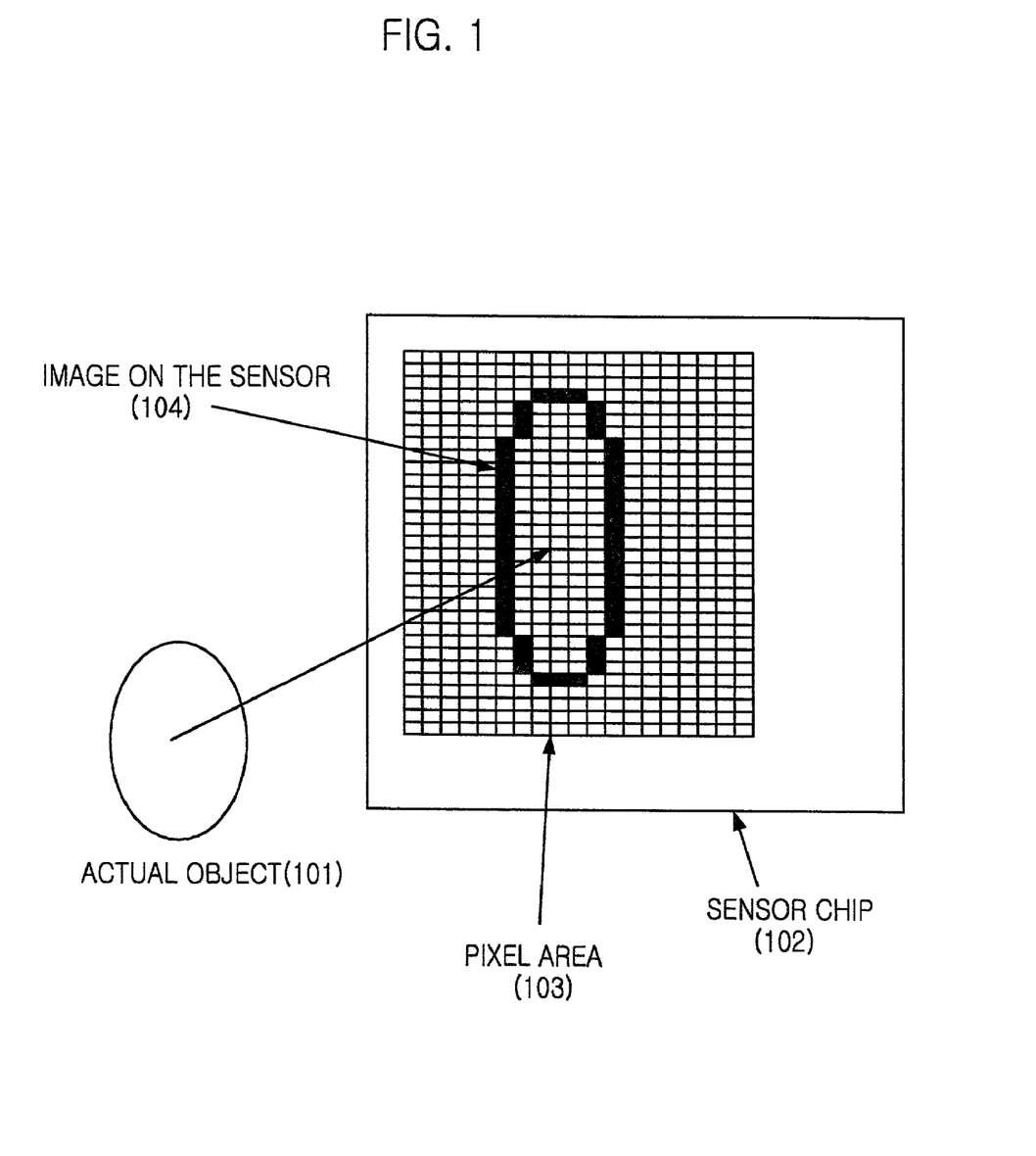
FIG. 1 is a schematic diagram of an actual object and the image on the sensor of the present invention.

FIG. 1 is a schematic diagram of an actual object and the image in the sensor having an actual object 101, a sensor chip 102, pixel area 103 and an image of the actual object 104 in the pixel area of the sensor.

At this point, a greater number of pixels in the pixel area on the drawing can improve the expression of the actual object.

An image sensor can be defined into two categories, namely black and white, and color. In case of the color image sensor, the color filter of RGB (Red, Green, Blue) is put on each pixel and responds to the corresponding color. Among several methods of putting pattern of the color filter, the representative one is called "Bayer format".

TABLE 1

| R1 | G1 | R2 | G2 | R3 | G3 |
|----|----|----|----|----|----|
| G4 | B1 | G5 | B2 | G6 | B3 |
| R4 | G7 | R5 | G8 | R6 | G9 |
| G  | B  | G  | B  | G  | B  |

Generally, each pixel of the image sensor can indicate only one color. However, all pixels should have all information of RGB in order to display an image. An interpolation technique is used to derive information that is not available. For example, the mathematic formation of the RGB values in the B1 pixel in the center-left of the 3×3 box shown in Table 1 by using interpolation is shown below.

$R = (R1+R2+R4+R5)/4$ $G = (G1+G4+G5+G7)/4$ $B = B1$ [Mathematic Formation 1]

By using the above formation, the R, G, B information in the B1 pixel can be determined.

For another example, the mathematic formation of the RGB values in the G6 pixel in the center-right of the 3×3 box of Table 1 can be determined.

$R = (R3+R6)/2$ $G = G6$ $B = (B2+B3)/2$ [Mathematic Formation 2]

Generally, an abnormally operating pixel can be found for several reasons during the manufacturing process. Because this pixel does not respond to the light properly, it appears differently when the image is reorganized using the output value. A pixel which appears brighter or darker than the actual object is called a Defective Pixel.

Among these, a defective pixel that appears brighter is called a "White Pixel" and a defective pixel that appears darker is called a "Dark Pixel." Sensors that have defective pixels cannot be sold.

The greater the number of pixels in the image sensor, the higher the price, however, the possibility of generating defective pixels also increases.

Actually, the defective pixels in the image sensor are the most important element affecting the yield. In accordance with this fact, it can be beneficial if products having a defective pixel can be sold.

To accomplish this, the Defective Pixel Concealment (DPC) method is used. This is method for concealing physically defective pixels. The basic theory of DPC is the same as the interpolation technique.

In other words, if the pixel that is for display is the one that is defective, the value of a normal pixel around it is substituted in place of the defective pixel.

TABLE 2

| R1 | G1 | R2 | G2 | R3 | G3 |
|----|----|----|----|----|----|
| G4 | B1 | G5 | B2 | G6 | B3 |
| R4 | G7 | R5 | G8 | R6 | G9 |

To get the RGB value of the B2 pixel in Table 2, $R=(R2+R3+R5+R6)/4$, $B=B2$, $G=(G2+G5+G6+G8)/4$ is used for normal pixel B2.

If B2 is a defective pixel, the value of the Blue color appears differently than an actual color. If $B=(B1+B3)/2$ is substituted for $B=B2$, the color gets more natural.

This method is the DPC method of interpolation. In another method, it can be substituted as $B=B1$ and this is the DPC method of substitution.

To describe the DPC method of interpolation, reference is made to Table 3 as shown below.

TABLE 3

| R1 | G1 | R2 | G2 | R3 | G3 |
|----|----|----|----|----|----|
| G4 | B1 | G5 | B2 | G6 | B3 |
| R4 | G7 | R5 | G8 | R6 | G9 |

In Table 3, the Green value of the G5 pixel becomes $G=G5$. If the G5 pixel is defective, it can be changed to $G=(G1+G2+G7+G8)$. At this point, it can simply be substituted as $G=G4$ using the DPC method of substitution.

Among the DPC methods above, the concealment of interpolation produces a more natural screen than the concealment of substitution, however, more hardware is required.

The prior art to implement the DPC method will be described referring to FIG. 2A to FIG. 2C.

Figure 2A:
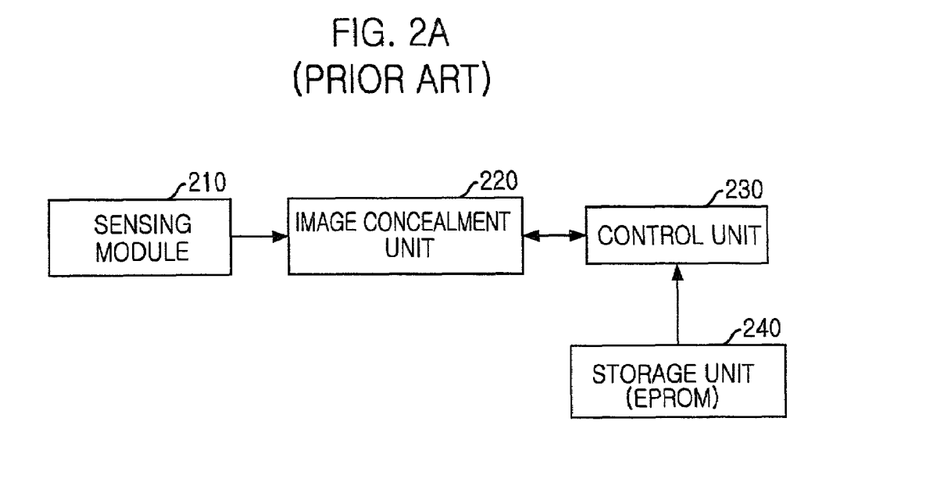
FIG. 2A through FIG. 2C are schematic diagrams of defective pixel concealment according to the prior image sensor and illustrating the camera as examples.
Figure 2B:
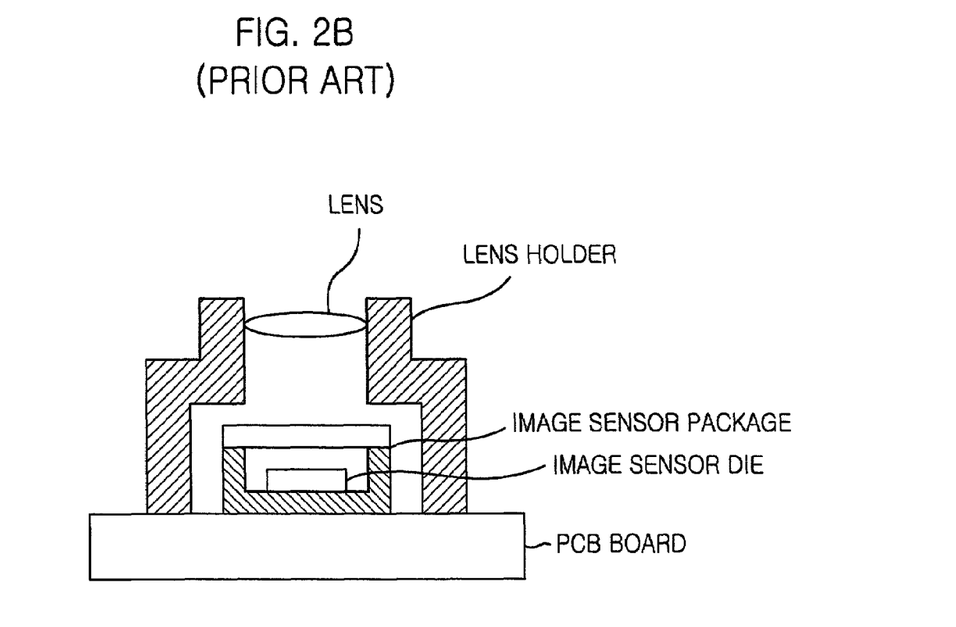
Figure 2C:
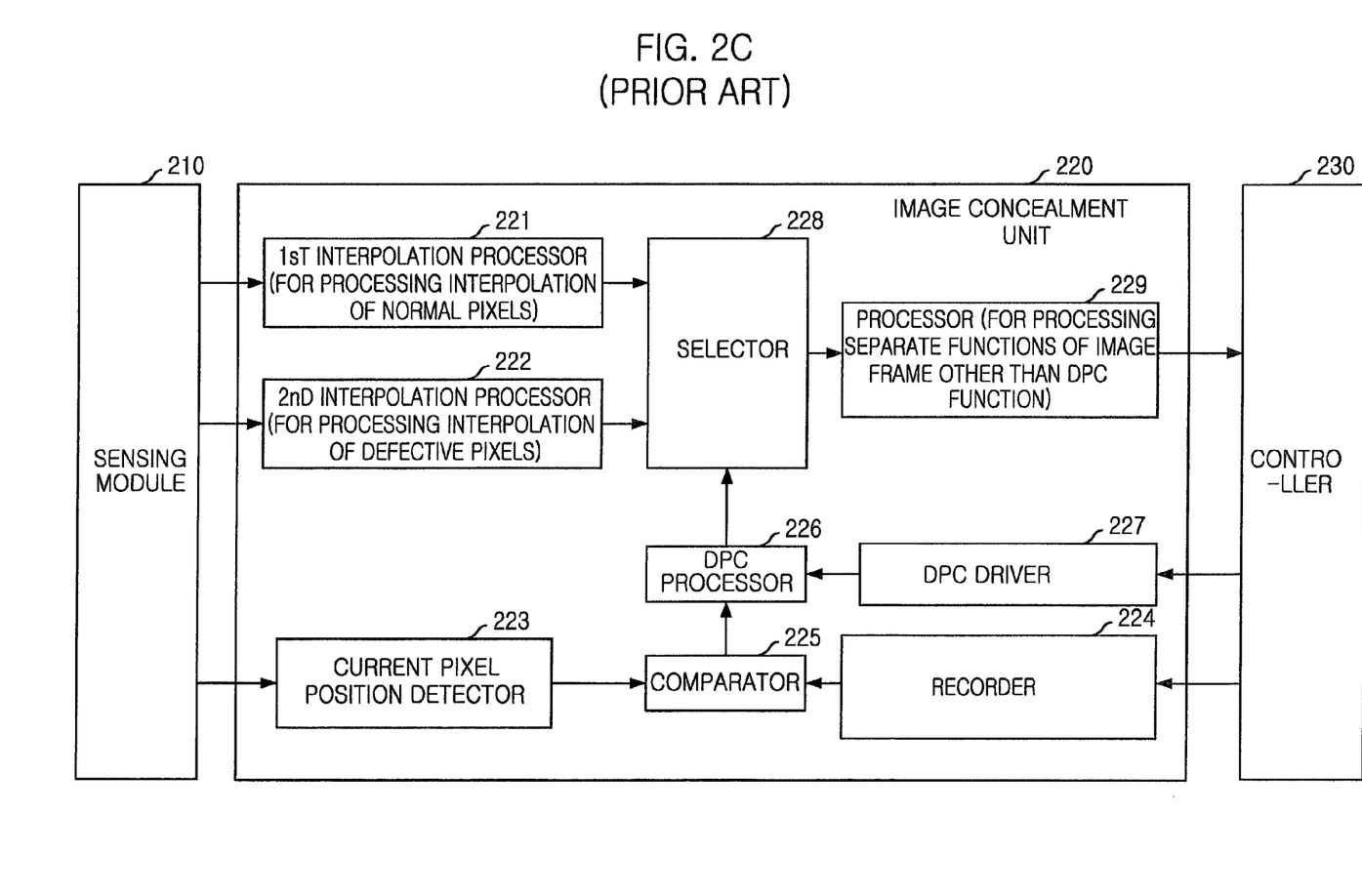

FIG. 2A through FIG. 2C are schematic diagrams of the defective pixel concealment of the prior image sensor and illustrate the camera as examples. FIG. 2A is an entire diagram of the defective pixel concealment of the image sensor. FIG. 2B is a detailed diagram of a sensing module 210 in FIG. 2A and FIG. 2C is a detailed diagram of an image concealment unit 220 in FIG. 2A.

Referring to FIG. 2A, the apparatus for concealing the defective pixels in the image sensors in the prior art comprises a sensing module 210, an image concealment unit 220, a storage unit 240 of EPROM to store information of the defective pixel positions, and a control unit 230.

The image concealment unit 220 is a circuit to process the image data transmitted from the sensor in the sensing module 210 with interpolation operation; a DPC circuit has to be included therein in order for the DPC to be processed before interpolation.

FIG. 2C is a detailed diagram of the image concealment unit 220 and comprises an interpolation processor 221 for processing interpolation of normal pixels, an interpolation processor 222 for processing interpolation of defective pixels, a current pixel position detector 223 of current pixel position for managing information of the current pixel position, a recorder 224 for recording position information of defective pixels, a comparator 225 for comparing current pixel position and defective pixel position, a DPC processor 226 for processing DPC process in compliance with the result from the comparator, a DPC driver 227 for driving the DPC processing device, a selector 228 for selecting an output result of the interpolation process devices in normal or defective pixels in compliance with the result from the DPC process device 226, and a processor 229 for LF processing separate functions of image frame other than DPC functions.

Furthermore, a control unit 230 analyzes and processes the data from the image concealment unit 220 and programs the sensing module 210 and the image concealment unit 220.

The storage unit 240 of EPROM stores the position information of defective pixels in the sensor pixel area of sensing module 210. When the camera operates in normal operating mode, the control unit 230 records the position information of defective pixels stored in the storage unit 240 to recorder 224 of defective pixel position in the image concealment unit 220.

The prior art of the apparatus for concealing defective pixels in the image sensors has the following methods.

First of all, the following is the method for programming to find defective pixels.

The exposure of the sensor in the sensing module 210 is set and the white side is captured under the light properly. Control unit 230 analyzes to find darker pixels in this capture as compared with other pixels, then treats those darker pixels as Dark Pixels and memorizes the position within their pixel area 103.

The exposure and light in the sensor is set in proper value and the black background is captured.

Control unit 230 analyzes to find brighter pixels in this capture as compared with other pixels, then treats those brighter pixels as White Pixels and memorizes their position within the pixel area 103.

The position information of the Dark Pixels and the White Pixels is stored in the storage unit 240.

Next, the following is the method for operating actual DPC by using the position of the defective pixels stored in the storage unit 240.

When the voltage is impressed in a camera, the control unit 230 reads out the defective pixel positions in the storage unit 240 and writes into recorder 224 defective pixel positions in the image concealment unit 220 and drives DPC driver 227.

After that, whenever interpolation is processed, the values in the current pixel position detector 223 of current pixel position and the values in the recorder 224 for recording the position information of defective pixels are compared. If the values are the same, the selector 228 selects the value processed in the interpolation processor 222 and delivers the value to the control unit 230 to conceal the defective pixels in the image sensors.

In this method for operating actual DPC, it memorizes the position of the defective pixel in the storage unit 240, loads it into the recorder 224 (ASIC register), then conceals and transmits the data if the defective pixel position is detected. The reason for reading out the data from the storage unit 240 and loading it into the recorder 224 (ASIC register) is because the direct DPC method cannot be completed with the position data due to the lack of speed in the operating time of the storage unit 240.

However, the position of a defective pixel has to be found under this method. In order to complete this method, the integration time has to be constant and the defective pixel has to be found.

But the prior DPC method has the following problems.

A complex process is required, such as EPROM to store the defective pixel position, the test for finding the position of a defective pixel in every exposure of sensor and capturing environment and the storing the defect position into EPROM.

Furthermore, this method cannot conceal a moving defective pixel.

SUMMARY OF THE INVENTION

It is, therefore, an object of the present invention to provide an apparatus and method for concealing defective pixels of image sensors having a test mode. The present invention does not need to have an external storing device nor programs for defective pixel in every test. Also, the present invention provides recording media for reading out from the programmed computer in order to conceal a moving defective pixel of an image sensor.

In accordance with an aspect of the present invention, there is provided an image sensing apparatus, comprising a sensing module for capturing an image from an object, wherein the sensing module includes a plurality of pixels and a light source for detecting a defect of the pixel and wherein the light source is turned on and off for a test mode; control means for determining whether there is any defective pixel in an image frame received from the sensing module using the light source and for storing a position about a defective pixel; and image concealment means for comparing a position of the detected defective pixel with a position of the image frame of the object and for concealing the detected defective pixel.

In accordance with another aspect of the present invention, there is provided a method for concealing a defective pixel in an image sensor, comprising steps of searching for a White Pixel and temporarily storing a position of the White Pixel for a test mode; searching for a Dark Pixel and temporarily storing a position of the Dark Pixel; storing the position of the White and Dark pixels as defective pixels and receiving the image from an object for a test mode; and comparing positions of pixels, which are associated with the image from the object, with the position of the defective pixel and combining an image for the defective pixel through an interpolation.

In accordance with still another aspect of the present invention, there is provided a method for concealing a defective pixel in an image sensor, comprising steps of storing a first image frame which is produced for a White pixel test mode; storing a second image frame which is produced for a Dark pixel test mode; determining whether there are any White or Dark pixels in the first and second frames, temporarily storing a position of the White or Dark pixel if there are any White or Dark pixels and recording the position of the White or Dark pixels as a position of a defective pixel and receiving an image from an object; and comparing positions of pixels, which are associated with the image from the object, with the position of the defective pixel and combining an image for the defective pixel through an interpolation.

DETAILED DESCRIPTION OF THE PREFERRED EMBODIMENTS

Hereinafter, an image sensor according to the present invention will be described in detail referring to the accompanying drawings.

An apparatus for concealing defective pixels according to the present invention has an internal device for searching for a defective pixel so that the defective pixel is found artificially.

An apparatus for concealing defective pixels of the image sensor, which will be described below, can be applied to camcorders, digital cameras and scanners. However, the present invention will be described in an image sensor built in a digital camera system.

Figure 3:
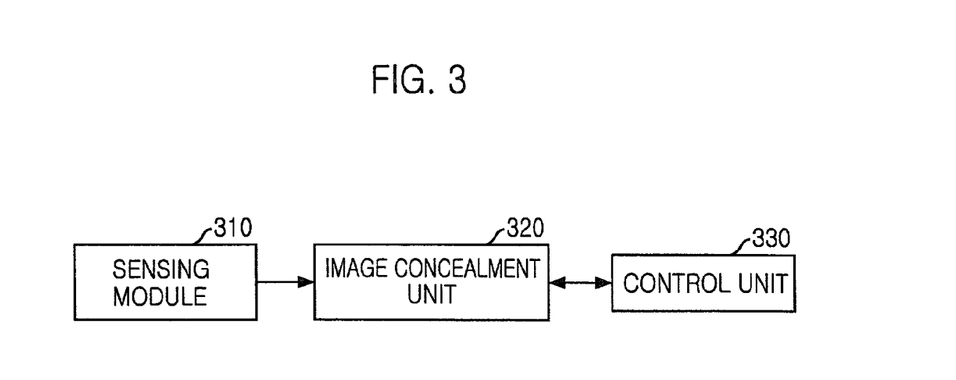
FIG. 3 is a diagram of an apparatus for concealing defective pixels in an image sensor having a test mode according to the present invention.
Figure 4A:
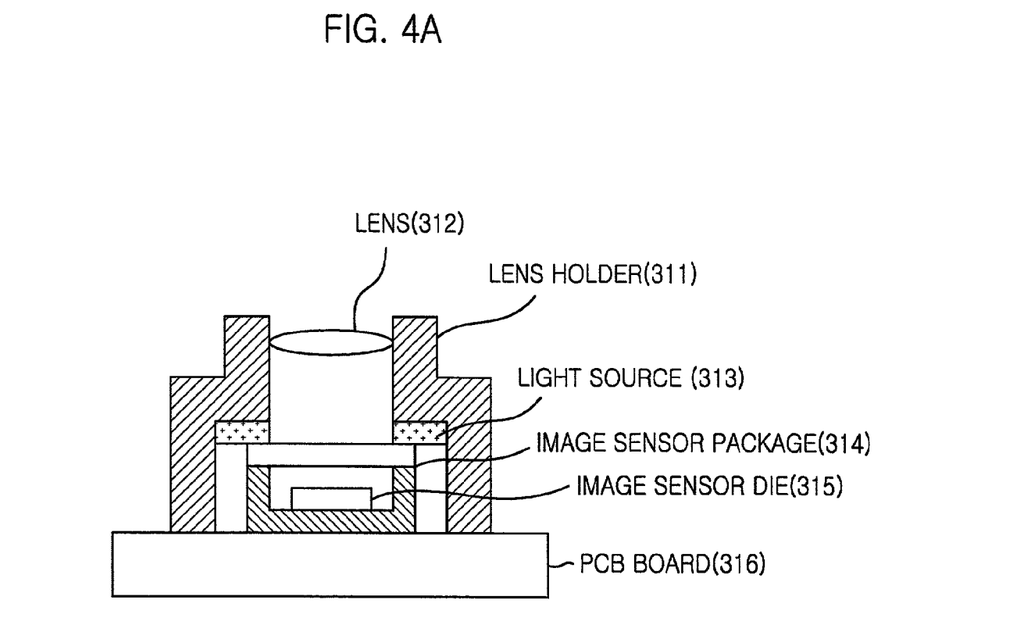
FIG. 4A is a detailed diagram for the sensing module in an apparatus for concealing defective pixels of an image sensor having a test mode according to the present invention.
Figure 4B:
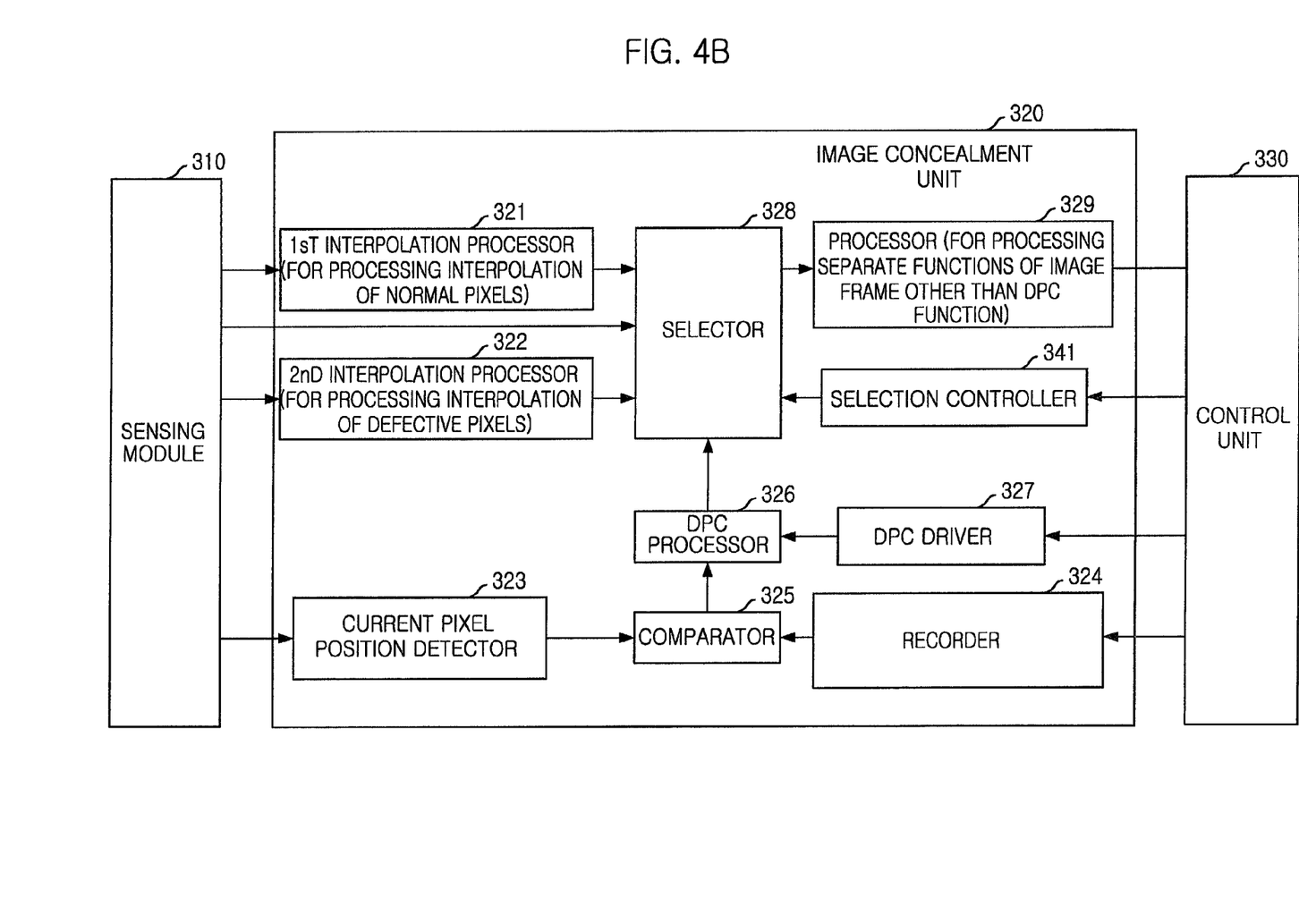
FIG. 4B is a detailed diagram for the image concealment unit in an apparatus for concealing defective pixels of an image sensor having a test mode according to the present invention.
Figure 4C:
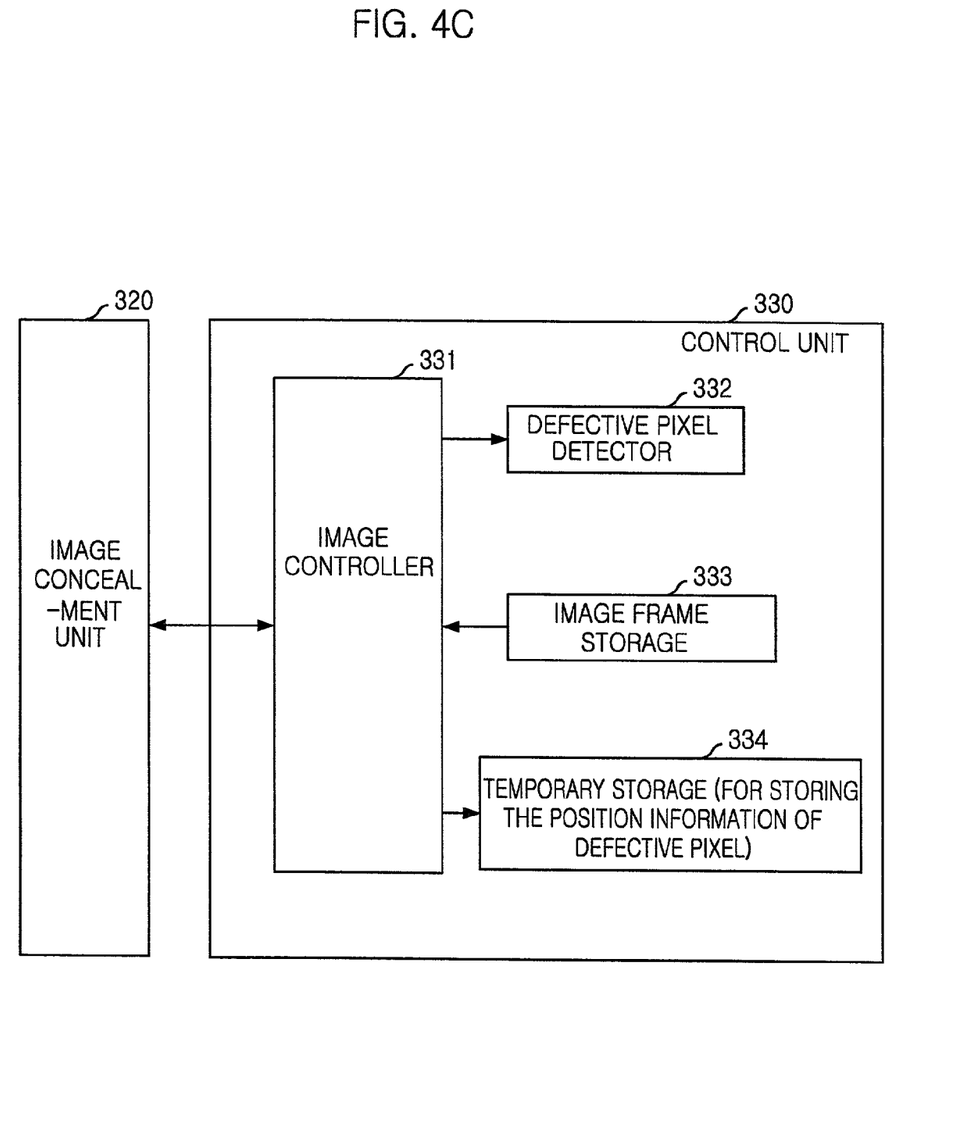
FIG. 4C is a detailed diagram for the control unit in an apparatus for concealing defective pixels of an image sensor having a test mode, as shown in FIG. 4B.

FIG. 3 is a diagram of an apparatus for concealing defective pixels in the image sensor having a test mode according to the present invention. FIG. 4A is a detailed diagram for the sensing module in the apparatus for concealing defective pixels of the image sensor and describes a detailed cross-section of the sensing module 310 of FIG. 3. FIG. 4B is a detailed diagram for the image concealment unit 320 in an apparatus for concealing defective pixels of the image sensor and describes a detailed cross-section of the image concealment unit 320 of FIG. 3. FIG. 4C is a detailed diagram for the control unit 330 in an apparatus for concealing defective pixels of the image sensor and describes a detailed cross-section of the control unit 330 of FIG. 3.

Referring to FIG. 3, the image sensor according to the present invention has a sensing module 310, an image concealment unit 320 and a control unit 330.

As illustrated in FIG. 4A, the sensing module 310 has a lens holder 311, a lens 312, a light source 313, an image sensor package 314, an image sensor die 315 and a PCB board 316. As compared with the sensing module 210 in FIG. 2B, the present invention further includes a light source.

Therefore, the sensing module 310 having an apparatus for concealing defective pixels of the image sensor in the present invention has a small light source close to sensors therein shown in FIG. 4A. This light source 313 is turned on during a test mode searching for the defective pixels and turned off during a normal operating mode.

During the normal operating mode, the light source 313 is located away from the path of the light transmitting through the lens because the light source 313 must not disturb the image capturing process. A brightness of the light source is as intensive as an actual image from the object does not generate an image, which has an effect on a testing image caused by the light source.

In FIG. 4B, the image concealment unit 320 includes a first interpolation processor 321 for processing interpolation of normal pixels, a second interpolation processor 322 for processing interpolation of defective pixels, a current pixel position detector 323 for managing information of the current pixel position, a recorder 324 for recording the position information of defective pixels, a comparator 325 for comparing current pixel positions and defective pixel positions, a DPC processor 326 for executing the DPC process in response to the result from the comparator, a DPC driver 327 for driving the DPC processor 326, a selector 328 for selectively outputting the output from the first or second interpolation processor 321 or 322 in the normal operating mode and for receiving the image frame from the sensing module 310 in the test mode, a processor 329 for processing separate functions of image frame other than DPC functions, and a selection controller 341 for controlling the selector 328 in response to a control signal, which indicates the test or normal mode, from the control unit 330.

In FIG. 4B, the image frame from the sensing module 310 is transmitted to the control unit 330 via the image concealment unit 320 in the test mode. However, the image frame from the sensing module 310 can be transmitted directly to the control unit 330 without passing through the image concealment unit 320.

As shown in FIG. 4C, the control unit 330 can be a computer system or a micro controller, and controls and processes the data from the sensing module 310 and the image concealment unit 320.

The control unit 330 comprises an image frame storage 333 for storing the image frame from the sensor in sensing module 310, a defective pixel detector 332 for detecting the defective pixels and storing a detecting program, a temporary storage 334 for storing the position information of the defective pixels detected from the defective pixel detector 332, and an image controller 331 for controlling information between the defective pixel detector 332, image frame storage 333, temporary storage 334 and image concealment unit 320.

Figure 5:
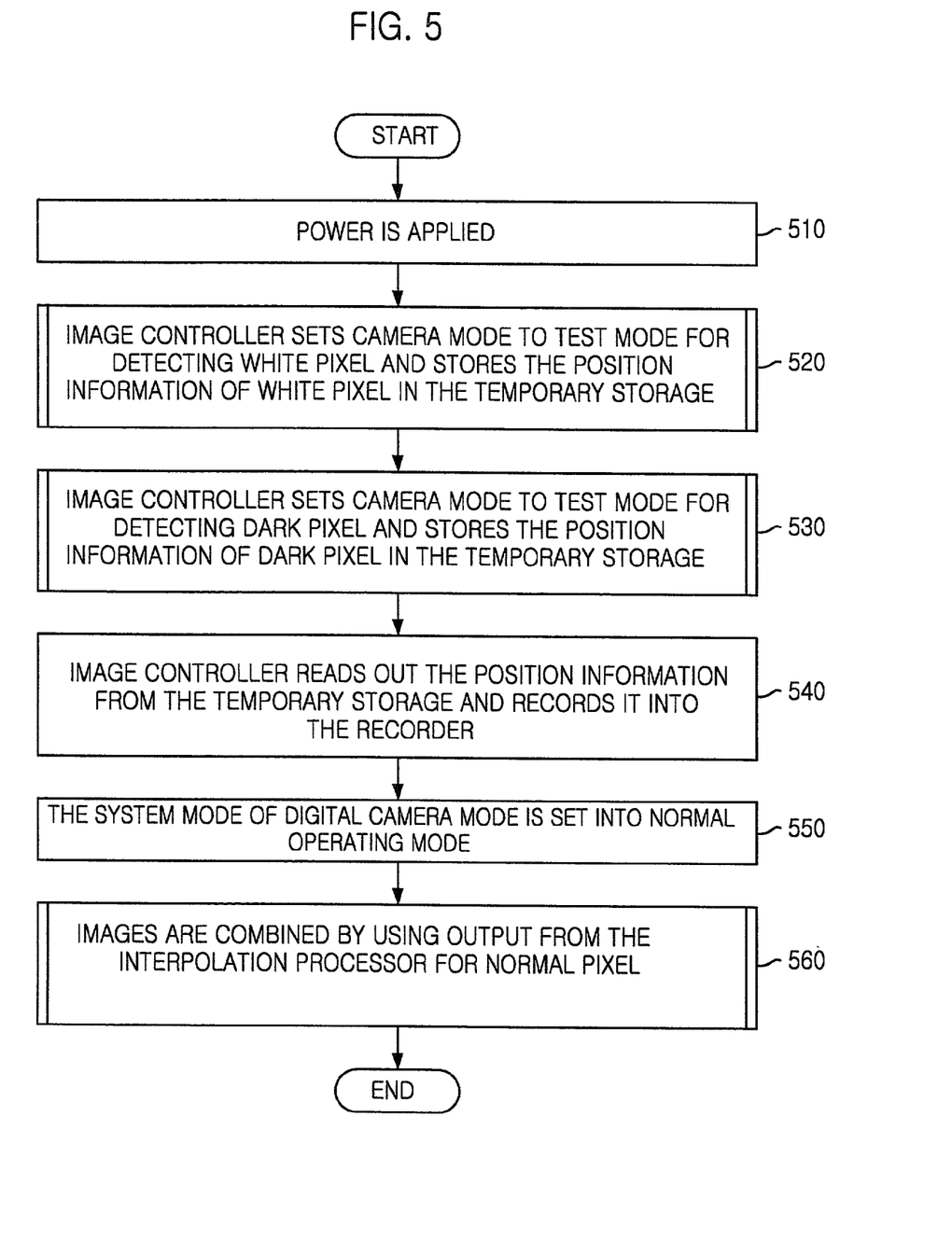
FIG. 5 is a flow chart of a method for concealing defective pixels of an image sensor according to the present invention.

FIG. 5 is a flow chart of a method for concealing defective pixels of the image sensor according to the present invention.

For concealing defective pixels in the image sensor, the power is applied to the apparatus for concealing defective pixels, step 510.

After that, the image controller 331 in the control unit a 330 sets the camera mode to test mode for detecting a White Pixel and stores the position information of the White Pixel in temporary storage 334, step 520. That is, the image controller 331 minimizes exposure of the sensor and disables interpolation function and DPC function in the image concealment unit 320.

If the image controller sets as test mode, the image control unit 330 reads out image frame from a sensor in the sensing module 310 and stores the image frame in the image frame storage 333. The defective pixel detector 332 reads out the image data in a pixel unit stored in the image frame storage 333, decides the state of pixel and, if the pixel is defective, stores the position of the pixel in the temporary storage 334 for defective pixels.

The detecting procedure is repeated for every pixel in the image frame storage 333.

After the detecting procedure, the image controller 331 in the control unit 330 sets the camera mode to test mode for detecting a Dark Pixel and stores the position information of the Dark Pixel in the temporary storage 334, step 530. That is, the image controller sets exposure of the sensor to a proper value, reads out an image frame from the sensor by turning on the light source and turns the light source off after storing the image frame in the image frame storage 333.

After turning off the light source, the defective pixel detector 332 reads out the image data in a pixel unit stored in the image frame storage 333, decides the state of pixel and, if the pixel is defective, stores the position of the pixel in the temporary storage 334 for defective pixels.

The detecting procedure is repeated for every pixel in the image frame storage 333.

After finishing the above procedures in steps 520 and 530, the image controller 331 reads out the position information from the temporary storage 334 for defective pixels, and records the position information into the recorder 324 for recording position information of the defective pixels, step 540. The system mode of the digital camera is then set into the normal operating mode, step 550. That is, DPC function and interpolation function is driven and the image is transmitted by a sensor in the sensing module 310.

The digital camera system in normal operating mode operates normally depending on the DPC circuit in the image concealment unit 320. After comparing the position information of the current pixel in the current pixel position detector 323 and the position information of the defective pixel in the recorder 324, output from the interpolation processor 322 for defective pixels is used if the same pixel is detected. If the same pixel is not detected, the images are combined by using output from the interpolation processor 321 for the normal pixel, step 560.

Figure 6A:
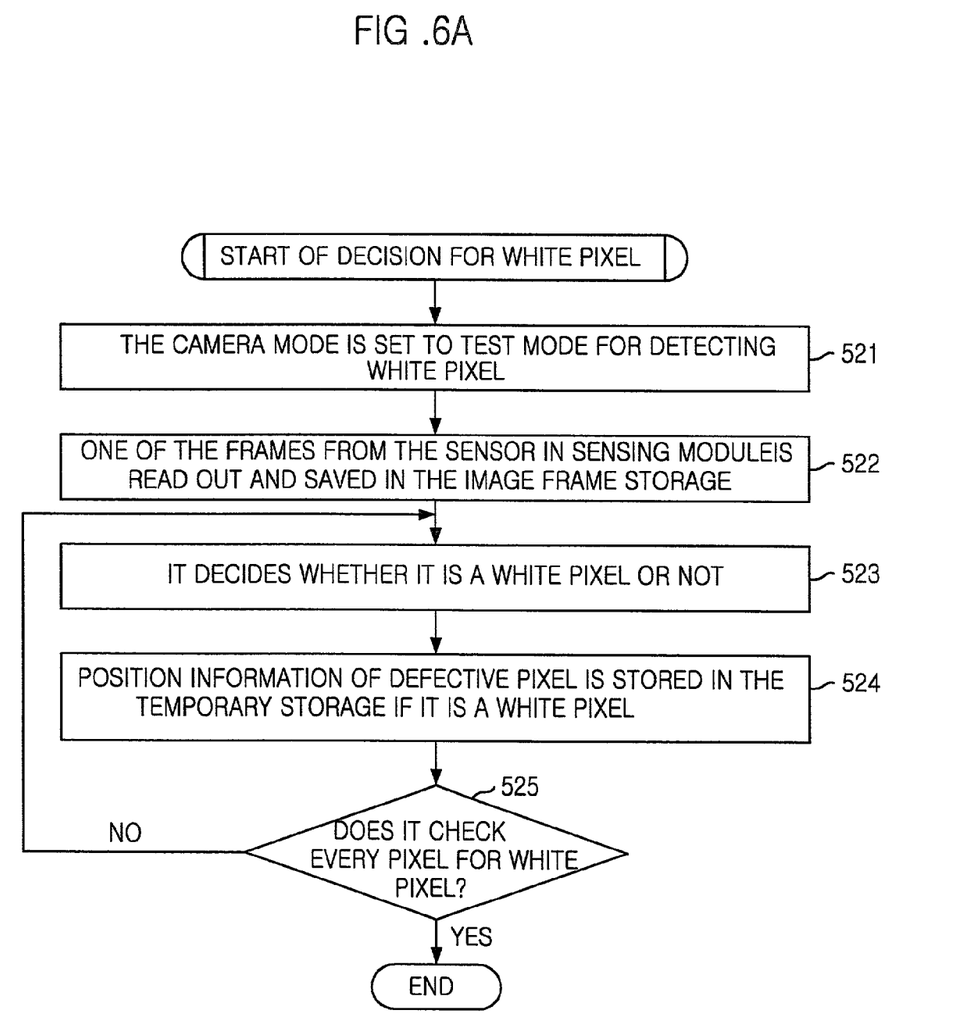
FIG. 6A is a detailed flow chart for a decision method of a White Pixel, according to the present invention.

As illustrated in FIGS. 5 and 6A, the camera mode is set to test mode for searching for the White Pixel, step 521, when the power is applied in the digital camera system, step 510.

The control unit 330 is programmed to minimize the exposure of the sensor in the sensing module 310 and disables interpolation function and DPC function in the image concealment unit 320.

In the test mode, one of the frames from the sensor in the sensing module 310 is read out and saved in the image frame storage 333, step 522.

When the image frame is saved, the defective pixel detector 332 examines each pixel saved in the image frame storage 333 to decide whether it is a White Pixel, step 523, and saves the position of pixels which are brighter than the others as White Pixels into the temporary storage 334 for defective pixels, step 524.

To identify the White Pixels, step 523, a pixel value is compared with the total frame average of values of other pixels. The following table shows the values of each pixel.

TABLE 4

| R1 | G1 | R2 | G2 | R3 |
| G4 | B1 | G5 | B2 | G6 |
| R4 | G7 | R5 | G8 | R6 |

First, the method for comparing with total frame average is to assume the G5 pixel is a defective pixel if $G5>A*V$, A is in the total frame average.

Next, the method for comparing values of other pixels is to test the G5 pixel as $G5>V*(G1+R2+G2+B1+B2+G7+R5+G8)/8$.

For another method, the value of the suspected pixel can be compared with two other pixels right next to the suspected pixel. For G5, this can be done by checking $G5>V*(B1+B2)/2$.

For a more simple method, the value of a suspected pixel can be compared with only one pixel right next to the suspected pixel. The G5 pixel is a defective pixel if $G5>V*B1$.

After deciding whether it is a defective pixel or not, the position information of every White Pixel is stored in the temporary storage 334, step 524. The steps of detecting White Pixels are repeated until all pixels have been checked, step 525.

Figure 6B:
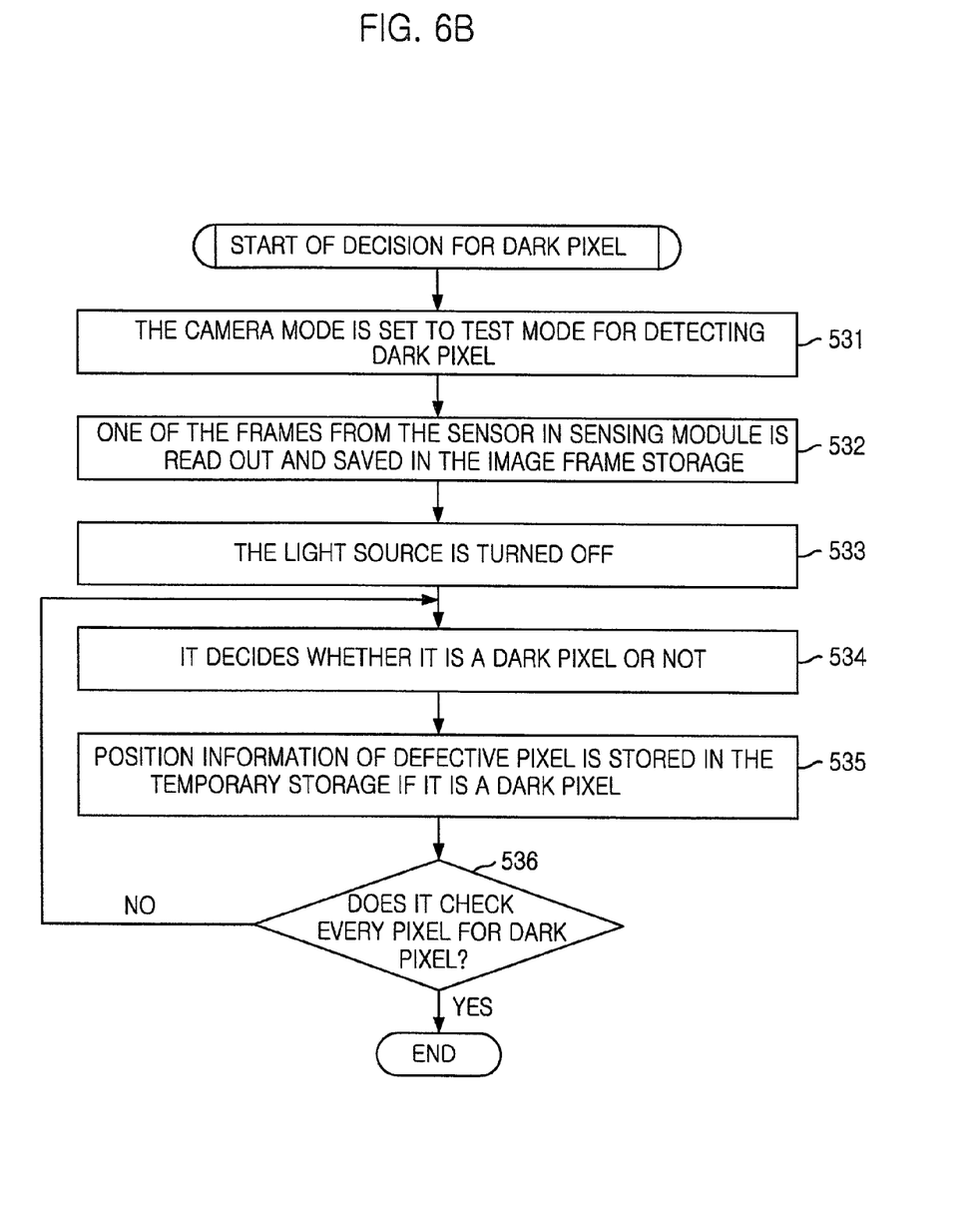
FIG. 6B is a detailed flow chart for a decision method of a Dark Pixel, according to the present invention.

FIG. 6B is a detailed flow chart for a decision method of the Dark Pixel illustrated in FIG. 5, step 530.

First of all, the camera mode is set to test mode for searching for the Dark Pixel, step 531.

The light source is turned on and the integration time is set. One raw data image frame of the image is read from the sensor in the sensing module 310, stored into the image frame storage 333, step 532, and the light source is turned off, step 533.

The image controller 331 examines every pixel saved in the image frame storage 333, step 534, and saves the position information of defective pixels if the pixel is darker than others, step 535.

To decide whether a pixel is a Dark Pixel, a pixel value is compared with the total frame average of values of other pixels. The following table shows the values of each pixel.

TABLE 5

| R1 | G1 | R2 | G2 | R3 |
| G4 | B1 | G5 | B2 | G6 |
| R4 | G7 | R5 | G8 | R6 |

First, the method for comparing with total frame average is to assume the G5 pixel is a defective pixel if $G5<A*V$, A is the total frame average.

Next, the method for comparing with values of other pixels is to test the G5 pixel as $G5<V*(G1+R2+G2+B1+B2+G7+R5+G8)/8$.

For another method, the value of a suspected pixel can be compared with two other pixels right next to the suspected pixel. For G5 pixel, this can be done by checking $G5<V*(B1+B2)/2$.

For a more simple method, the value of a suspected pixel can be compared with only one pixel right next to the suspected pixel. The G5 pixel is a defective pixel if $G5<V*B1$.

After deciding whether the pixel is a defective pixel or not, the position information of every Dark Pixel is stored in the temporary storage 334. The steps of detecting Dark Pixels are repeated until every pixel has been checked, step 536.

Figure 6C:
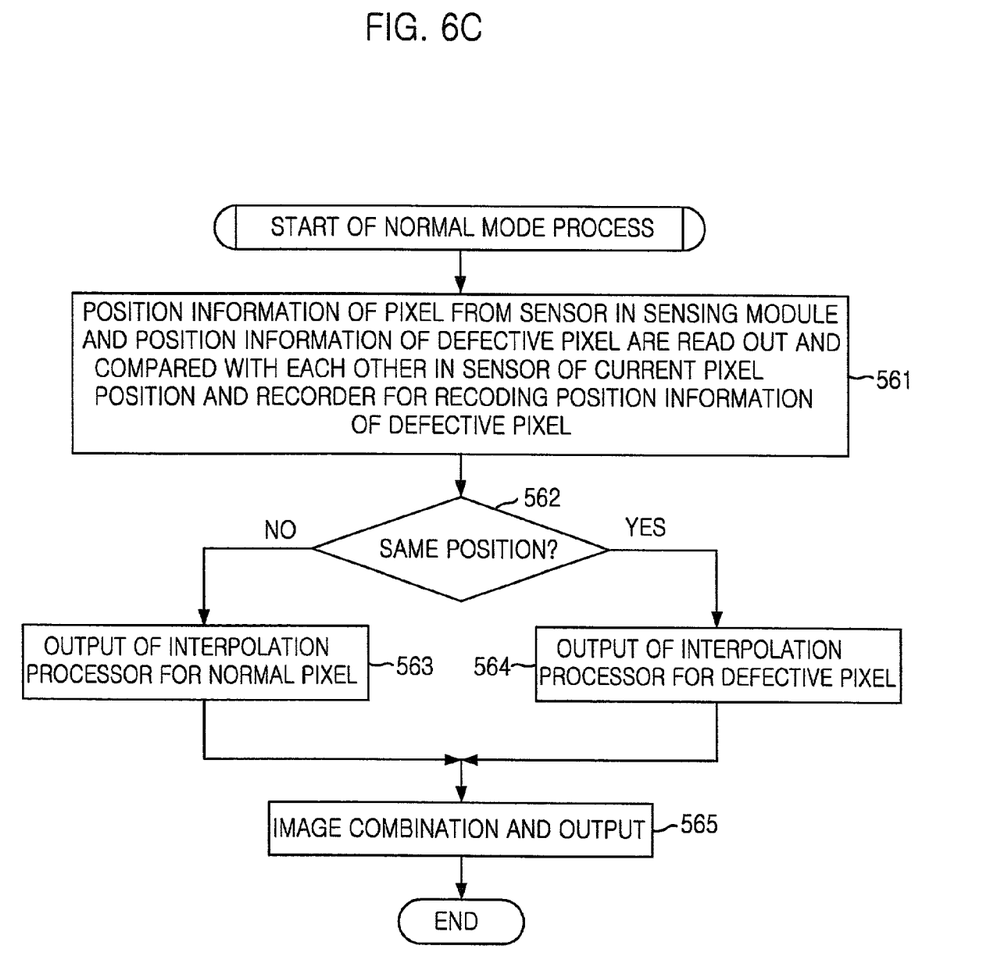
FIG. 6C is a detailed flow chart of a method for normal operating mode in a method for concealing defective pixels of an image sensor and describes detailed procedure of the normal operating mode, according to the present invention.

FIG. 6C is a detailed flow chart illustrating the normal operating mode in concealing the defective pixel in the image sensor and describes detailed procedures of the normal operating mode, steps 550 and 560, in FIG. 5.

In normal operating mode, pixel position information from the sensor in the sensing module 310 and position information of defective pixels are read out and compared with each other in the current pixel position detector 323 of current pixel position and the recorder 324 for recording position information of defective pixels, step 561.

After comparison, if the position of the current pixel is identical with the position of any of the defective pixels, step 562, a pixel is deemed a defective pixel and the outcome of the interpolation processor 322 for defective pixel is generated, step 564.

If the position of the current pixel is not identical with the position of any of the defective pixels, step 562, a pixel is deemed a normal pixel and the outcome of the interpolation processor 321 for normal pixels is generated, step 563.

By using the outcomes from the above procedures, the image is presented through the output unit of the digital camera system after combining images, step 565.

The present invention does not require an external storage such as EPROM. Furthermore, a complex process is not required such as the test for finding the position of defective pixel in every exposure of the sensor and capturing environment.

The present invention is advantageous for a moving defective pixel.

The present invention has been described in sufficient detail with a certain degree of particularity. Various modifications will be apparent to one skilled in the art, and should be considered in view of the appended claims.

What is claimed is:

1. An image sensing apparatus, comprising:
   a sensing module for capturing an image from an object, wherein the sensing module includes a plurality of pixels and a light source for detecting a defective pixel, the light source being turned on for a test mode for detecting the defective pixel and off for a normal mode;
   a control means for determining whether there are any defective pixels in an image frame received from the sensing module using the light source and for storing a position about a defective pixel; and
   image concealment means for comparing a position of the defective pixel with a position of a current pixel of an image frame of the object outputted from the sensing module to thereby conceal the defective pixel.

2. The apparatus as recited in claim 1, wherein the light source in the sensing module is disposed to be out of a light incident path from the object.

3. The apparatus as recited in claim 1, wherein a brightness of the light source is as intensive as an actual image from the object does not generate an image, which has an effect on a testing image caused by the light source.

4. The apparatus as recited in claim 1, wherein the control means includes:
   an image frame storing means for storing the image frame received from the sensing module;
   a defective pixel detecting means for storing and executing a program to detect defective pixels in the stored image frame, wherein the program is executed on a frame by frame basis;
   a temporary storing means for storing the position of the defective pixel; and
   an image control means for controlling the image frame storing means, the defective pixel detecting means, the temporary storing means, the sensing module and the image concealment means.

5. The apparatus as recited in claim 4, wherein the image concealment means includes:
   a first interpolation processing means for performing an interpolation for normal pixels;
   a second interpolation processing means for performing an interpolation for defective pixels;
   a position detecting means for managing positions of current pixels;
   a recording means for reading out the position of the defective pixel from the temporary storing means and for recording the position of the defective pixel;
   a comparing means for comparing the positions of the current and defective pixels;
   a defective pixel concealment (DPC) processing means for concealing an image in response to the result from the comparing means; and
   a selection means for selecting one of an output of the first interpolation processing means and second interpolation processing means in response to the result from the DPC processing means.

6. A method for concealing a defective pixel in an image sensor with a sensing module for capturing an image from an object, comprising steps of:
   a) providing the sensing module for capturing an image from an object, wherein the sensing module includes a plurality of pixels and a light source for detecting a defective pixel, the light source being turned on for a test mode and off for a normal mode and the sensing module light source located away from a light incident path from the object;
   b) minimizing exposure of the sensing module;
   c) turning on the light source within the sensing module;
   d) searching for a White Pixel by comparing each pixel with total frame average or values of other pixels and temporarily storing a position of the White Pixel at the test mode;
   e) searching for a Dark Pixel by comparing each pixel with total frame average or values of other pixels and temporarily storing a position of the Dark Pixel at the test mode;
   f) storing the positions of the White and Dark pixels as a position of defective pixels at the test mode; and
   g) receiving an image from an object and performing a first interpolation and a second interpolation to the image at the normal mode; and h) selecting one of a result of the first interpolation and a result of the second interpolation based on a result of comparing positions of pixels, which are associated with the image from the object, with the position of the defective pixels and combining an image for the defective pixel through an interpolation.

7. The method as recited in claim 6, wherein the step d) includes steps of:
   d1) setting the test mode by saving a frame with the light source within the sensing module on;
   d2) storing the frame which is inputted under the test mode; and
   d3) comparing each of selected pixels of the image frame with an average of all the pixels within the image frame or comparing each pixel of the image frame with other adjacent pixels and temporarily storing a position of a selected pixel as the position of the White pixel based on a result of comparing each of selected pixels with the average or the other adjacent pixels.

8. The method as recited in claim 6, wherein the step e) includes steps of:
   e1) setting the test mode by saving a frame with the light source within the sensing module on;
   e2) storing the frame which is inputted under the test mode;
   e3) turning off the light source; and
   e4) comparing each of selected pixels of the image frame with an average of all the pixels within the image frame or comparing each pixel of the image frame with other adjacent pixels and temporarily storing a position of a selected pixel as the position of the Dark pixel based on a result of comparing each of selected pixels with the average or the other adjacent pixels.

9. The method as recited in claim 7, wherein the step d3) includes a step of comparing each pixel with an average of eight adjacent pixels.

10. The method as recited in claim 7, wherein the step d3) includes a step of comparing each pixel with an average of two adjacent pixels.

11. The method as recited in claim 7, wherein the step d3) includes a step of comparing each pixel with one adjacent pixel.

12. The method as recited in claim 8, wherein the step b4) includes a step of comparing each pixel with an average of eight adjacent pixels.

13. The method as recited in claim 8, wherein the step e4) includes a step of comparing each pixel with an average of two adjacent pixels.

14. The method as recited in claim 8, wherein the step e4) includes a step of comparing each pixel with one adjacent pixel.

15. A method for concealing a defective pixel in an image sensor, with a sensing module for capturing an image from an object, comprising steps of:
   a) providing the sensing module for capturing an image form an object, wherein the sensing module includes a plurality of pixels and a light source for detecting a defective pixel, the light source being turned on for a test mode and off for a normal mode and the light source located away from a light incident path from the object;
   b) minimizing exposure of the sensing module;
   c) turning on the light source within the sensing module;
   d) storing a first image frame which is produced for a White pixel test mode and detecting a White pixel by comparing each pixel with total frame average or value of other pixels to thereby store a position of the White pixel as a position of a defective pixel at the White pixel test mode;
   e) storing a second image frame which is produced for a Dark pixel test mode and detecting a Dark pixel by comparing each pixel with total frame average or value of other pixels to thereby store a position of the Dark pixel as a position of a defective pixel at the Dark pixel test mode;
   f) receiving an image from an object and performing a first interpolation and a second interpolation to the image at a normal mode; and
   g) selecting one of a result of the first interpolation and a result of the second interpolation based on a result of comparing positions of pixels, which are associated with the image from the object, with the position of the defective pixel and combing an image for the defective pixel through an interpolation.

16. The method as recited in claim 15, wherein the step e) includes steps of:
   e1) setting the test mode by saving a frame with the light source within the sensing module on;
   e2) storing the frame produced when the light source is turned on; and
   e3) turning off the light source.

17. The method as recited in claim 15, wherein the step includes steps d) and e) includes steps of:
   d1) comparing each of selected pixels of the image frame with an average of all the pixels within the first image frame or comparing each pixel of the first image frame with other adjacent pixels and temporarily storing a position of a selected pixel as the position of the defective pixel based on a result of the comparing each of the selected pixels with the average or the other adjacent pixels; and
   d2) recording the position of the defective pixels.

18. The method as recited in claim 17, wherein the step d1) includes a step of comparing each pixel with an average of eight adjacent pixels.

19. The method as recited in claim 17, wherein the step d1) includes a step of comparing each pixel with an average of two adjacent pixels.

20. The method as recited in claim 17, wherein the steps d1) includes a step of comparing each pixel with one adjacent pixel.

21. The method as recited in claim 15, wherein the step g) includes steps of:
   g1) comparing positions of pixels, which are associated with the image from the object, with the positions of the White and Dark pixels;
   g2) if at least one pixel has a same position as a position of at least one of the White or Dark pixels, deeming the at least one pixel as a defective pixel selecting the result of the second interpolation; and
   g3) if at least one pixel does not has the same position as at least one of the White or Dark pixels, selecting the result of the second interpolation.

22. A computer readable medium comprising program codes for realizing functions of:
   a) minimizing the exposure of a sensing module of an image sensor;
   b) turning on a light source within the sensing module;
   c) searching for a White Pixel by comparing each pixel with total frame average or values of other pixels and temporarily storing a position of the White Pixel at a test mode;

d) searching for a Dark Pixel by comparing each pixel with total frame average or values of other pixels and temporarily storing a position of the Dark Pixel at a test mode;
e) storing the positions of the White and Dark pixels as a position of defective pixels at the test mode;
f) receiving an image from an object and performing a first interpolation and a second interpolation to the image at a normal mode; and
f) selecting one of a result of the first interpolation and a result of the second interpolation based on a result of comparing position of pixels, which are associated with the image from the object, with the position of the defective pixels and combining an image for the defective pixel through an interpolation.

23. A computer readable medium comprising program codes for realizing functions of:
a) minimizing the exposure of a sensing module of an image sensor;
b) turning on a light source within the sensing module;
c) storing a first image from which is produced for a White pixel test mode and detecting a White pixel by comparing each pixel with total frame average or value of other pixels to thereby store a position of the White pixel as a position of a defective pixel at the White pixel test mode;
d) storing a second image from which is produced for a Dark pixel test mode and detecting a Dark pixel by comparing each pixel with total frame average or value of other pixels to thereby store a position of the Dark pixel as a position of a defective pixel at the Dark pixel test mode;
e) receiving an image from an object and performing a first interpolation and a second interpolation to the image at a normal mode; and
f) selecting one of a result of the first interpolation and a result of the second interpolation based on a result of comparing positions of pixels, which are associated with the image from the object, with the position of the defective pixel and combining an image for the defective pixel through an interpolation.

* * * * *